June 9, 1964  R. O. BOCK ETAL  3,136,987
ANALOG TO DIGITAL CONVERTER
Filed Feb. 5, 1959
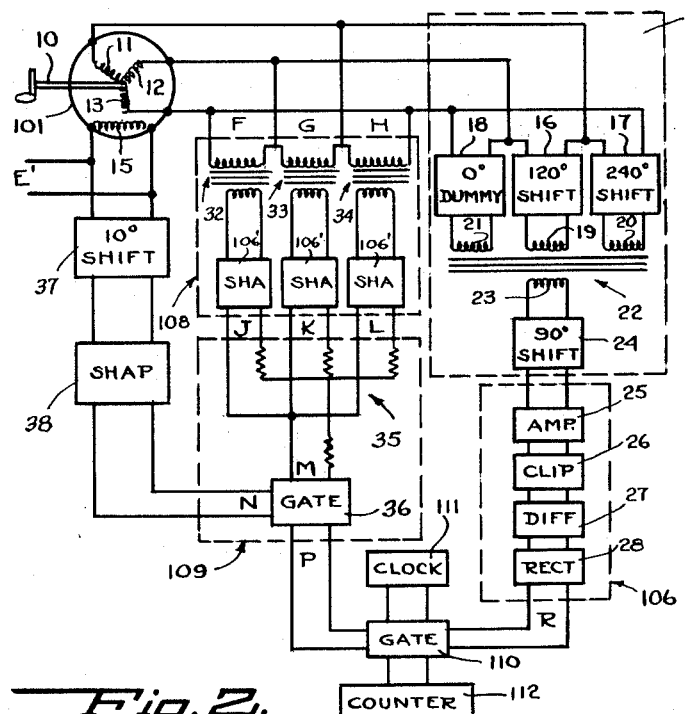
Fig. 2.
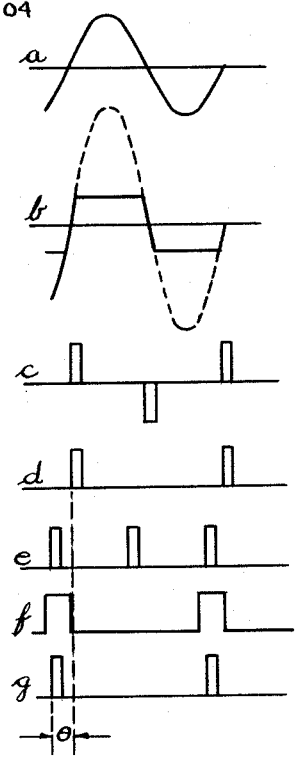
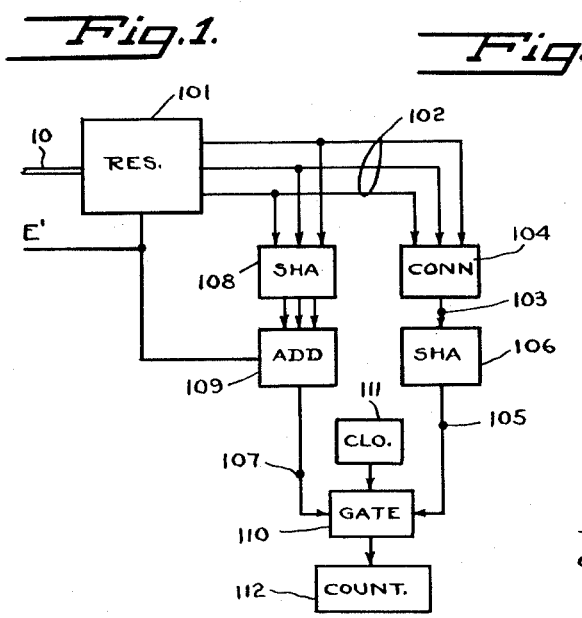
Fig. 1.  Fig. 4
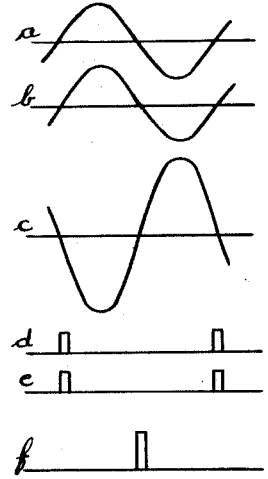
INVENTORS.
ROBERT O. BOCK
GARETH M. DAVIDSON
BY
Raymond A. Paquin
ATTORNEY.

United States Patent Office 3,136,987
Patented June 9, 1964

3,136,987
ANALOG TO DIGITAL CONVERTER
Robert O. Bock, Garden City, and Gareth M. Davidson, Bronx, N.Y., assignors to American Bosch Arma Corporation, a corporation of New York
Filed Feb. 5, 1959, Ser. No. 791,476
3 Claims. (Cl. 340—347)

The present invention relates to electronic computers and has special reference to means for converting a synchro shaft angle to a digital quantity without the use of moving parts.

A convenient, accurate and reliable method for conversion of analog quantities into digital numbers has been sought in the computer art for some time. In the present invention, the shaft angle, or analog input is represented by a phase angle, $\phi$, of the carrier frequency as compared with a reference phase. During the time interval represented by the phase difference, $\phi$, a count is made using pulses from a high frequency "clock" generator. The resulting count is proportional to the angle $\phi$ which is the actual shaft angle.

In principle the analog shaft displaces the input of a trigonometric electromechanical transducer or resolver to produce a plurality of in-phase alternating signals whose amplitudes are trigonometrically related to the analog value. The plurality of signals are converted to a single signal of constant amplitude but varying phase, in which the phase angle is proportional to the analog value.

The in-phase signals are utilized to form a reference pulse which starts the input of a series of high frequency pulses to a counter, and the variable phase signal is used to form a pulse which stops the counter input.

One of the problems encountered is in the establishment of a reference pulse from the in-phase signal. No one of the resolver voltages can be used alone for this purpose since each one goes through zero and reverses for continued variation of analog input. For this invention the individual in-phase signals are each converted to pulses, these pulses are added together and alternate pulses are eliminated to produce the reference pulse signal.

For a more complete understanding of the invention, reference may be had to the accompanying diagrams, in which:

FIG. 1 is a block diagram of the basic circuitry;
FIG. 2 is a preferred embodiment of the diagram of FIG. 1;
FIG. 3 is a series of seven waves showing the forms of voltages in various parts of FIG. 2; and
FIG. 4 is a series of six waves depicting synthesis of the reference pulse signal.

With reference now to FIG. 1 of the drawings, the basic circuit is shown as a block diagram. The analog shaft input at shaft 10 is adapted to drive the input member of a resolver 101 to produce a plurality of space phase output signals 102 whose trigonometrically related amplitudes indicate the displacement of shaft 10. The space phase signals 102 are converted to a time phase signal 103 in the converter 104, where the phase angle of the signal 103 compared to the time phase of the zero or reference phase signals 102, indicates the displacement of shaft 10. The sine wave signal 103 is converted to a pulse 105 in the pulse shaper 106 which operates to produce a time-phase pulse each time the signal 103 changes from negative to positive, as will be described in connection with FIG. 2. The pulse 105 is applied to gate 110, as is a reference pulse 107. The excitation voltage E to the resolver 101 cannot be used as an indicator of reference phase because of the varying phase shift between input and output of the resolver 101. None of the individual space phase signals 102 can be used as a reference alone since each is equal to zero at some time in the displacement of shaft 10. Also, the sum of the signal 102 at any given time is always equal to zero. For this reason the reference pulse signal 107 is synthesized from the reference phase signals 102 by first shaping each of the signals 102 into pulses occurring as the signal changes from negative to positive in the pulse shaper 108, then adding the pulses and finally eliminating each alternate pulse in the adder 109 by comparison with the phase of the resolver energizing signal E'. The reference pulse 107 and the time phase pulse 105 are connected to the gate 110 to open and close the circuit between the clock or pulse generator 111 and the counter 112. The gate 110 is open for a period corresponding to the phase angle of signal 103 thereby allowing a proportional number of pulses to activate the counter 112.

FIG. 2 is a preferred embodiment of FIG. 1 showing the various blocks of FIG. 1 in added detail. The analog input, available as a displacement of shaft 10, is adapted to displace proportionally the secondary windings 11, 12, 13 of the electromechanical resolver 101, which is preferably a synchro generator, with respect to the primary winding 15. The primary winding 15 is energized by a constant alternating voltage E', producing three signals F, G and H across the output terminals of resolver 101 which are trigonometrically related according to the following equations, $F = E \sin wt \sin \theta$, $G = E \sin wt \sin (\theta + 120)$ and $H = E \sin wt \sin (\theta + 240)$ where ($E \sin wt$) may be shifted in phase with respect to $E'$ during transmission through the resolver 101, and $\theta$ is the angular displacement of shaft 10 from a reference position ($\theta = $ zero).

This series of space phase signals is converted to a single time phase signal in the converter 104 which includes a 120° phase shifter 16 connected across the voltage G, a 240° phase shifter 17 connected across the voltage H and a dummy load 18 across the voltage F to maintain a balanced load on resolver 101. The primary windings 19, 20, 21 of transformer 22 are energized by the outputs of phase shifters 16, 17 and dummy load 18 respectively, which may be expressed as $E \sin (wt+120) \sin (\theta+120)$, $E \sin (wt+240) \sin (\theta+240)$ and $E \sin wt \sin \theta$. The output, $I'$, of secondary winding 23 of transformer 22 is proportional to the sum of the excitations of the primary windings 19, 20, 21 and through trigonometric manipulation can be shown to be proportional to $3/2 \ E \cos (wt-\theta)$. The signal $I'$ is again shifted 90° in-phase to obtain a signal $I = 3/2 \ E \sin (wt-\theta)$ in phase shifter 24. The $I$ signal is applied to a pulse shaper 106 which produces a pulse each time $I'$ passes through zero with a positive slope. The shaper 106 includes a high gain amplifier 25, a clipper 26 and a differentiating network 27. The signal $I$ may be represented by the sine wave, $a$, of FIG. 3. The amplified output of amplifier 25 is represented by the dotted curve $3b$, which is limited or clipped to the substantially square wave shown solid in FIG. $3b$ in the clipper 26. The wave $3b$ is then differentiated, as by an R-C network for example in a differentiator 27 to produce the positive and negative pulses of FIG. $3c$. The negative pulses are eliminated, for example, by a rectifier 28, to produce the pulse signal R, represented by FIG. $3d$.

In a similar manner, each of the signals F, G, H, are converted to pulses J, K, L, in the pulse shapers 106', all included in the shaper 108. Isolation transformers 32, 33, 34 are interposed between the signals F, G, H and the pulse shapers 106'. The output pulses J, K, L are added as by the resistance network 35 to produce the pulse M, FIG. $3e$. The composition of pulse M is demonstrated in FIG. 4 where the curves $4a, b, c$ represent the signals F, G and H, and the separate pulses J, K, L, obtained therefrom are shown in FIGS. $4d, e, f$, respectively. Their sum produced in network 35 is the pulse signal $3e$. The alternate pulses of FIG. $3e$ must be eliminated and for this purpose a gate 36, which may be a usual "and" circuit, is fed by the pulses M and a pulse signal N derived from the resolver 101 energizing signal E'. The signal E' is shifted in phase by substantially the amount of phase shift between the primary and secondary signals of resolver 101 in the phase shifter 37 and shaped into pulses in the pulse shaper 38, such as shaper 106, to produce the signal 3f of FIG. 3. The output of gate 36, or of the adder 109, designated as signal pulse P is shown in FIG. 3g. The pulses P and R are applied to the gate 110 to open and close respectively the circuit between the pulse generator or clock 111 and the counter 112. The number of pulses transmitted through gate 110 are indicated in the counter 112 and are a direct indication of the phase angle θ between the pulses P and R.

Although each of the signals F, G, H may be of unequal magnitude the high gain amplification and subsequent limiting performed in the pulse shapers will produce pulses of substantially equal width whose sum does not vary excessively in magnitude. The higher the amplification the more uniform the pulses produced and the better the accuracy of the conversion. It should be noted that the pulse width must be small enough to permit the degree of resolution desired.

We claim:

1. In an analog to digital converter, an electromechanical transducer adapted to be energized by a constant-amplitude alternating voltage and having an input shaft displaced according to an analog value, said transducer producing a plurality of separate electrical space-phase signals each of which has an amplitude of substantially zero for some position of said input shaft, means for converting said space-phase signals into a corresponding time-phase signal having a variable time phase representative of the position of said input shaft, pulse shaping means for changing said time-phase signal into a pulse signal comprising a pulse occurring at a time representative of said time phase of said time-phase signal, a plurality of pulse shaping means for changing said space-phase signals into pulses, means for adding said pulses derived from said space-phase signals to obtain a composite pulse signal, means responsive to said constant-amplitude alternating voltage to derive a gating pulse therefrom, electronic gate means supplied with said composite pulse signal and with said gating pulse selectively to pass a reference pulse from said composite pulse signal upon the occurrence of said gating pulse, and digital counting means activated by said reference pulse and deactivated by said pulse signal derived from said time-phase signal.

2. In an analog to digital converter, an electromechanical transducer adapted to be energized by a constant-amplitude alternating voltage and having an input shaft displaced according to an analog value, said transducer producing a plurality of space-phase signals, means for converting said space-phase signals into a corresponding time-phase signal, pulse shaping means for changing said time-phase signal into a pulse signal, a plurality of pulse shaping means for changing said space-phase signals into pulses, means for adding said pulses derived from said space-phase signals to obtain a composite pulse signal, phase-shifting means responsive to said constant amplitude alternating voltage for shifting the phase thereof, additional pulse-shaping means supplied with said phase-shifted alternating voltage for producing a gating pulse, electronic gate means supplied with said composite pulse signal and responsive to said gating pulse selectively to pass a reference pulse from said composite pulse signal, and digital counting means activated by said reference pulse and deactivated by said pulse signal derived from said time-phase signal.

3. In an analog to digital converter, means for producing a plurality of separate trigonometrically related in-phase signals having relative amplitudes representitng an analog quantity, means for combining said in-phase signals to produce a signal displaced in time-phase from said in-phase signals according to said analog quantity, a plurality of pulse shaping means each responsive to an input signal thereto for producing a pulse each time said input signal passes through zero in a predetermined direction, means for supplying said time-phase signal to the input of one of said pulse shaping means to produce corresponding time-phase pulses, means for connecting each of said in-phase signals separately to the inputs of respective different ones of said pulse shaping means, means for obtaining the sum of the outputs of said different ones of said pulse shaping means to produce a composite pulse train, means for eliminating alternate pulses in said composite pulse train to provide a train of reference pulses, and digital counting means activated by said reference pulses and deactivated by said time-phase pulses derived from said time-phase signal.

References Cited in the file of this patent

UNITED STATES PATENTS

| | | |
|---|---|---|
| 2,850,240 | Dickinson | Sept. 2, 1958 |
| 2,894,256 | Kronacher | July 7, 1959 |
| 2,901,170 | Poole | Aug. 25, 1959 |
| 2,966,300 | Dickinson | Dec. 27, 1960 |
| 2,987,717 | Antonji et al. | June 6, 1961 |